(12) United States Patent
Conger

(10) Patent No.: US 8,811,754 B2
(45) Date of Patent: Aug. 19, 2014

(54) SPATIAL CLUSTERING OF PIXELS OF A MULTISPECTRAL IMAGE

(75) Inventor: James Lynn Conger, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 62 days.

(21) Appl. No.: 13/353,728

(22) Filed: Jan. 19, 2012

(65) Prior Publication Data

US 2013/0272617 A1 Oct. 17, 2013

Related U.S. Application Data

(60) Provisional application No. 61/528,735, filed on Aug. 29, 2011.

(51) Int. Cl.
*G06K 9/00* (2006.01)

(52) U.S. Cl.
USPC .......................................................... 382/225

(58) Field of Classification Search
None
See application file for complete search history.

(56) References Cited

U.S. PATENT DOCUMENTS

| | | | | |
|---|---|---|---|---|
| 2008/0069477 A1* | 3/2008 | Engels et al. | ................. | 382/291 |
| 2009/0129671 A1* | 5/2009 | Hu et al. | ....................... | 382/173 |
| 2009/0214084 A1* | 8/2009 | Asner | ........................... | 382/110 |
| 2010/0104191 A1* | 4/2010 | McGwire | ..................... | 382/190 |
| 2011/0222785 A1* | 9/2011 | Hirohata et al. | ............. | 382/224 |
| 2011/0264998 A1* | 10/2011 | Evans | ........................... | 715/277 |

OTHER PUBLICATIONS

A Contiguity-Enhanced K-Means Clustering Algorithm for Unsupervised Multispectral Image Segmentation. James Theiler and Galen Gisler. 1997. SPIE vol. 3159.*

Adaptive Threshold for Spectral Matching of Hyperspectral Data. J. Schwarz and K. Staenz. 2001.*

Bali, N. and A. Mohammad-Djafari, "Bayesian Approach with Hidden Markov Modeling and Mean Field Approximation for Hyperspectral Data Analysis," *IEEE Transactions on Image Processing* 17(2):214-225, 2008.

Duarte-Carvajalino, J.M. et al., "Unsupervised Spectral-Spatial Classification of Hyperspectral Imagery Using Real and Complex Features and Generalized Histograms," *Proc. of SPIE* 69660:69660F-1-69660F-12, 2008.

Lee, S. and M.M. Crawford, "Hierarchical Clustering Approach for Unsupervised Image Classification of Hyperspectral Data," *IEEE*, pp. 941-944, 2004.

Li, Q. et al., "Spatial Kernel K-Harmonic Means Clustering for Multi-Spectral Image Segmentation," *IET Image Process* 1(2):156-167, 2007.

(Continued)

*Primary Examiner* — Stephen R Koziol
*Assistant Examiner* — Delomia Gilliard
(74) *Attorney, Agent, or Firm* — Perkins Coie LLP

(57) ABSTRACT

A method and system for clustering the pixels of a multispectral image is provided. A clustering system computes a maximum spectral similarity score for each pixel that indicates the similarity between that pixel and the most similar neighboring. To determine the maximum similarity score for a pixel, the clustering system generates a similarity score between that pixel and each of its neighboring pixels and then selects the similarity score that represents the highest similarity as the maximum similarity score. The clustering system may apply a filtering criterion based on the maximum similarity score so that pixels with similarity scores below a minimum threshold are not clustered. The clustering system changes the current pixel values of the pixels in a cluster based on an averaging of the original pixel values of the pixels in the cluster.

22 Claims, 13 Drawing Sheets

(56) References Cited

OTHER PUBLICATIONS

Liu, S. et al., "Segmentation of Multispectral Remote Sensing Images Based on Ant Colony Optimization Algorithm," *GEC '09*, pp. 891-894, 2009.

Tarabalka, Y. et al., "Spectral-Spatial Classification of Hyperspectral Imagery Based on Partitional Clustering Techniques," *IEEE Transactions on Geoscience and Remote Sensing* 47(8):2973-2987, 2009.

Theiler, J. and G. Gisler, "A Contiguity-Enhanced K-Means Clustering Algorithm for Unsupervised Multispectral Image Segmentation," *Proc. SPIE* 3159:1-11, 1997.

Wong, R.S. et al., "K-Means Reclustering: An Alternative Approach to Automatic Target Cueing in Hyperspectral Images," *SPIE* 4726:162-172, 2002.

Zherebin, A.A. et al., "Method of Compressing Hyperspectral Images and Detecting Spectral Anomalies," *Proc. SPIE* 4541:401-409, 2002.

Sengupta, S.K. et al., "Analysis of Hyper-Spectral Data Derived from an Imaging Fourier Transform: A Statistical Perspective," Lawrence Livermore National Laboratory, 12 pages, 1996.

\* cited by examiner

SPATIAL CLUSTERING OF PIXELS OF A MULTISPECTRAL IMAGE

CROSS REFERENCE TO RELATED APPLICATION

This application claims the benefit of U.S. Provisional Application No. 61/528,735; filed Aug. 29, 2011, and entitled "SPATIAL CLUSTERING OF PIXELS OF A MULTISPECTRAL IMAGE," which is incorporated herein in its entirety by reference.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

A multispectral image stores an intensity vector for each pixel of the image. The intensity vector has an intensity value representing radiance for each frequency for each spectral band in a spectrum. A multispectral image may be captured by a multispectral instrument that has a slit for receiving a certain number of pixels across the instrument and that is moved over an area to be imaged. For example, a multispectral image of a and area may be collected by a multispectral instrument that is mounted on an airplane that flies over the and area in a direction perpendicular to the slit. Such an instrument may include a prism that splits the electromagnetic wave for each pixel into intensity values that represent different frequencies. FIG. 1 illustrates the data representing a multispectral image. The x-axis represents the direction across the instrument, the y-axis represents the direction of travel, and the z-axis represents the intensity vectors. The term "hyperspectral" is generally used to refer to a multispectral image that has more than 100 spectral bands, and some of them can even have more than 256 spectral bands. Because of the large number of spectral bands for each pixel, hyperspectral data "cubes" contain vast amounts of data that require considerable storage and processing resources. Alternatively, a multispectral instrument can be constructed using a Fourier transform spectrometer that creates the same data type via repeated exposures of the same scene with slightly different optical path lengths. The resultant data can be considered identical in format to that shown in FIG. 1.

Analysis of multispectral images is useful in many disciplines such as mineralogy, physics, and surveillance. For example, the analysis of a multispectral image of a and area may be useful in determining the mineral composition of the and area or in identifying buildings, roads, and vehicles in the and area. Although automated techniques have been developed to analyze multispectral images, the techniques tend to be relatively slow because of the time needed to process the vast amounts of data associated with multispectral images, and especially hyperspectral images.

To reduce the time needed to process multispectral images, some techniques reduce the number of dimensions of the multispectral images or duster together pixels that have similar values. One technique for reducing the dimensions generates a grayscale or color image by averaging many spectral bands. For example, if a multispectral image has 256 spectral bands, averaging the spectral bands may reduce the multispectral image to a color image with three spectral bands: 8-9.5 microns representing blue, 9.5-11 microns representing green, and 11-12.5 microns representing red. One difficulty associated with such a technique is that most of the information content of the multispectral image is lost.

One technique for clustering, first applies a K-means clustering that is followed by a spatial clustering of the pixels in each duster. Such a technique is useful for reducing the data volume needed to represent a multispectral image. The K-means clustering groups pixels with similar spectra into each of the K dusters regardless of where the pixels are located in the multispectral image. After the K-means spectral clustering is complete, the technique then displays the pixels within each of the K dusters into a two-dimensional image. In many cases the extent of the dusters represents the same object or same portion of an object, although this is not guaranteed by the algorithm. A difficulty with K-means clustering is that the number K of dusters needs to be determined before the clustering starts. If the number of dusters is too small, pixels with very different intensity vectors may be placed in the same duster, and thus pixels representing different objects may be placed in the same spatial duster. If the number of dusters is too large, pixels with very similar intensity vectors may end up in different clusters, and thus pixels representing the same object may be placed in different spatial clusters. Another difficulty with such a technique is that the clustering and spatial clustering can be computationally expensive.

DETAILED DESCRIPTION

Figure 1:
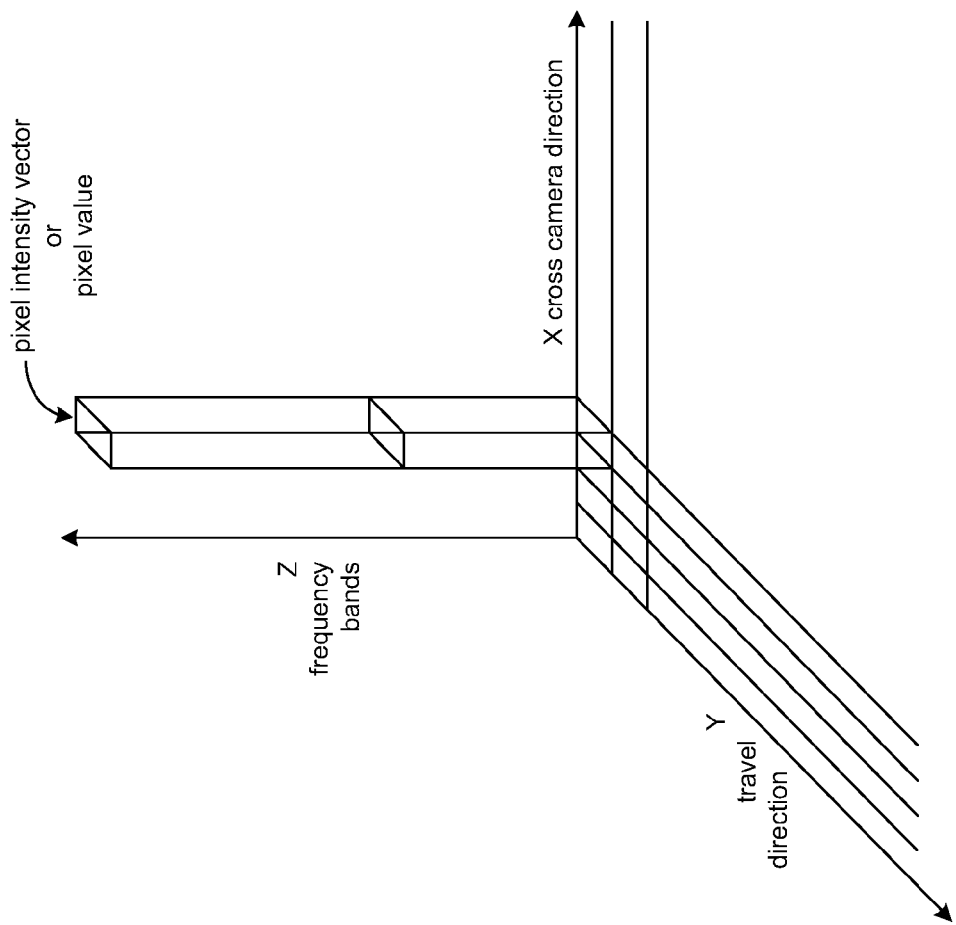
FIG. 1 illustrates the data representing a multispectral image.

A method and system for clustering the pixels of a multispectral image is provided, in some embodiments, a clustering system computes a maximum similarity score for each pixel indicating the similarity between that pixel and the most similar neighboring pixel based on comparison of their pixel spectra (i.e., pixel intensity vectors). Two pixels are considered neighboring pixels when they are horizontally, vertically, or diagonally connected. Thus, each pixel of an image, except for the pixels along the edges of the image, has eight neighboring pixels. To determine the maximum similarity score for a pixel, the clustering system generates a similarity score between that pixel and each of its neighboring pixels and then selects the similarity score that represents the highest similarity as the maximum similarity score. For example, the similarly scores between a pixel and its neighboring pixels may be 2.4, 20, 45, 18, 12, 16, 5.6, and 1.7, where a higher similarity score indicates a higher similarity. In such a case, the clustering system identifies the similarity score 45 as the maximum similarity score for that pixel. The clustering system then dusters neighboring pixels (that are not already in the same duster) that are most similar. Continuing with the example, the clustering system dusters the pixel with the neighboring pixel with a similarity score of 45. The clustering system may apply a filtering criterion and only cluster pixels when the filtering criterion is passed. For example, if the filtering criterion specifies that pixels with a maximum similarity score below 5.0 are not similar enough to be clustered and the maximum similarly score for a pixel is 4.2, the clustering system will not duster that pixel with its neighboring pixel. If neither pixel is in a duster, the clustering system creates a new duster. If only one pixel is in a duster, the clustering system adds the pixel that is not in the duster to the duster, if both pixels are in different dusters, the clustering system combines the dusters. The clustering system changes the current pixel spectral values of the pixels in a duster based on the average original pixel spectral values for the pixels in that duster. For example, if a duster has 5 pixels with original pixel values of 0.5, 0.6, 0.4, 0.5, and 0.5 for one spectral band, the clustering system sets the current pixel values for those pixels to 0.5 (i.e., 2.5/5). The clustering system may process the pixels in a row major ordering (i.e., processing each pixel of a row before processing the pixels of the next row). The clustering system would then repeat the iterations of identifying the maximum similarity scores for each pixel and clustering neighboring pixels using current pixel values until a termination criterion is satisfied. The termination criterion may specify a fixed number of iterations to be performed, minimal clustering activity in the last iteration, and so on.

The clustering system groups pixels so that each duster represents collections of pixels that are very similar in the spectral domain. The clustering algorithm may be referred to as a "spectral crystallization" algorithm as an analogy to the natural process of solid crystal formation in a saturated solution. The clustering algorithm and the natural process both grow "crystals" or "dusters" from initial seeds and continue to grow until either the medium is exhausted or some other termination criterion is reached.

In some embodiments, the clustering system generates a similarity score between two pixels based on the angle between the intensity vectors of the pixels. In some embodiments, the clustering system may use the cosine of the angle or the angle Itself, referred to as "spectral angle," as the similarity score. The clustering system may calculate the spectral angle α according to the following equation:

$$\alpha = \arccos\left(\frac{x \cdot y}{\|x\|\|y\|}\right)$$

where x and y represent the intensity vectors of the pixels, • represents the dot product of x and y, ‖x‖ represents the magnitude of x, and arc cos(α) represents the arc cosine of α. The clustering system may preprocess the intensity vectors of an image by subtracting the mean intensity vector of the image from the intensity vector of each pixel. Because the spectral angle between pixels representing the same portion of an object (e.g., a rooftop) may be very small, the clustering system may use the inverse of the spectral angle as the similarity score to increase the numeric difference between similar intensity vectors. The clustering system may represent the inverse of the spectral angle by the following equation:

$$s = \alpha^{-1}$$

The clustering system may use a variety a well-known techniques for measuring similarity. For example, if the similarity score may weight frequencies of interest more heavily than other frequencies.

Figure 2:
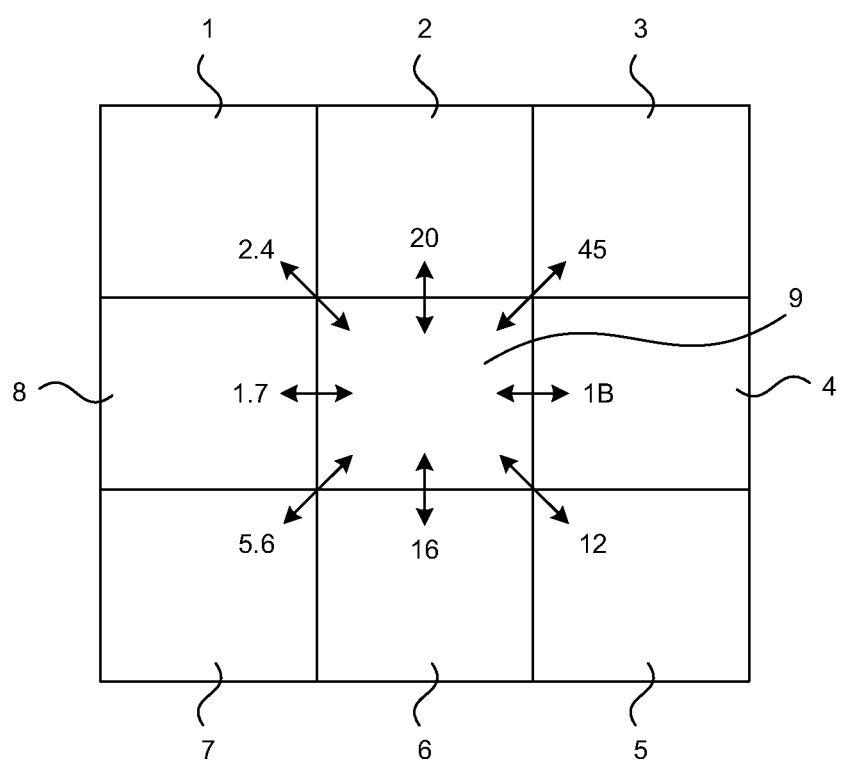
FIG. 2 illustrates a calculation of the similarity scores between a pixel and its neighboring pixels.

FIG. 2 illustrates a calculation of the similarity scores between a pixel and its neighboring pixels. Each square represents a pixel of a multispectral image. The pixels 1-8 are neighboring pixels to the center pixel 9. The numeric value for each of the neighboring pixels represents the similarity score between that pixel and the center pixel. For example, the similarity score between pixel 1 and pixel 9 is 2.4. The highest similarity score of 45 is between pixel 3 and pixel 9, and the clustering system selects it as the maximum similarity score for pixel 9. The clustering system will then duster pixel 3 with pixel 9 and set the current spectral intensity vectors for those pixels to the average spectral intensity vector for the pixels in that duster. This averaging is a form of noise reduction among neighboring pixels that are similar in the spectral domain.

During each iteration, the clustering system may perform a select similarity score phase and a clustering phase. During the select similarity score phase, the clustering system selects and stores the maximum similarity score for each pixel. Then, during the clustering phase, the clustering system uses the maximum similarity scores to duster the pixels. Alternatively, the clustering system may select the maximum similarity score for a pixel and then duster that pixel before processing the next pixel, meaning that it performs the select similarity score phase and the clustering phase on a pixel-by-pixel basis.

In some embodiments, the clustering system uses various filtering criteria to control when neighboring pixels are to be clustered. The filtering criteria ensure that a pixel is only added to a duster when its maximum similarity score is above certain minimum thresholds and that a duster will not have more than a maximum number of pixels ("maximum duster size"). The minimum thresholds for the maximum similarity score include an overall minimum, a first-iteration minimum, a per-iteration minimum, and a per-duster similarity. The clustering system may use any combination of these filtering criteria and/or other filtering criteria.

The overall minimum threshold specifies that a pixel whose maximum similarity score is below a certain similarity score is not to be added to a duster. The overall minimum threshold may have a default similar score that can be changed by a user. The overall minimum threshold specifies the minimum spectral angle needed between two pixels for those pixels to be considered similar. The clustering system will not duster a pixel whose maximum similarity score during the current iteration is below the overall minimum threshold. The overall minimum threshold remains constant throughout the iterations.

The first-iteration minimum threshold specifies that a pixel whose maximum similarity score is below a certain percentile of the maximum similarity scores as calculated during the first iteration is never to be in a duster. The percentile may have a default percentage (e.g., 1%) that may be changed by a user to ensure that at least a certain percentage of pairs of pixels will not be placed in the same duster. The clustering system identifies pairs of pixels with maximum similarity scores below the specified percentile during the first iteration from a histogram (described below) and marks them as "do not duster." During each iteration, the clustering system ensures that the pixels of those pairs are not put into the same duster.

The per-iteration minimum threshold specifies that a pixel whose maximum similarity score is below a certain percentile of the maximum similarity scores as calculated during each iteration is not to be clustered during that iteration. The percentile may have a default percentage (e.g., 80%) that may be changed by a user to ensure that at least a certain percentage of pixels will not be clustered during the current iteration. For example, when the percentage is 80%, the clustering system will only consider clustering pixels with a maximum similarity score in the highest 20%. To calculate a percentile, the clustering system may generate a histogram that contains the count of pixels with similarity scores in different similarity score ranges. For example, the histogram may have ranges for the similarity scores of 1-5, 6-10, and so on. The clustering system then determines which range has the percentile percentage of pixels in ranges above it and sets the clustering threshold based on that range.

The per-duster similarity threshold specifies that a pixel whose maximum similarity score is below a certain percentage of the average of the maximum similarity scores of the pixels in a duster is not to be placed in that duster. The percentage may have a default percentage that may be changed by a user to ensure that a pixel added to a duster is similar enough to the pixels currently in the duster. The clustering system may maintain, for each cluster, a running average of the maximum similarity scores of the pixels that are added to the duster. The clustering system ensures a pixel is not added to a duster when the maximum similarity score of that pixel is below the certain percentage of the running average for that duster. Evidence suggests that a per-duster similarity threshold in the range of 10-20% may be optimal for certain types of images. The clustering system may use a percentage on the low end of this range for noisy images as noise tends to create artificial distinctions between pixels from the same object.

The maximum duster size specifies that no duster will have more than a certain percentage of all the pixels. The percentage may have a default percentage (e.g., 20%) that may be changed by a user to ensure that a duster does not get too large. The duster system ensures that a pixel is not added to a duster that has more than that certain percentage of pixels.

In some embodiments, the clustering system may reduce the dimensionality of the intensity vectors by averaging neighboring spectral bands. In addition to reducing the processing time, the dimensionality reduction may help reduce the amount of noise in an image.

Figure 3:
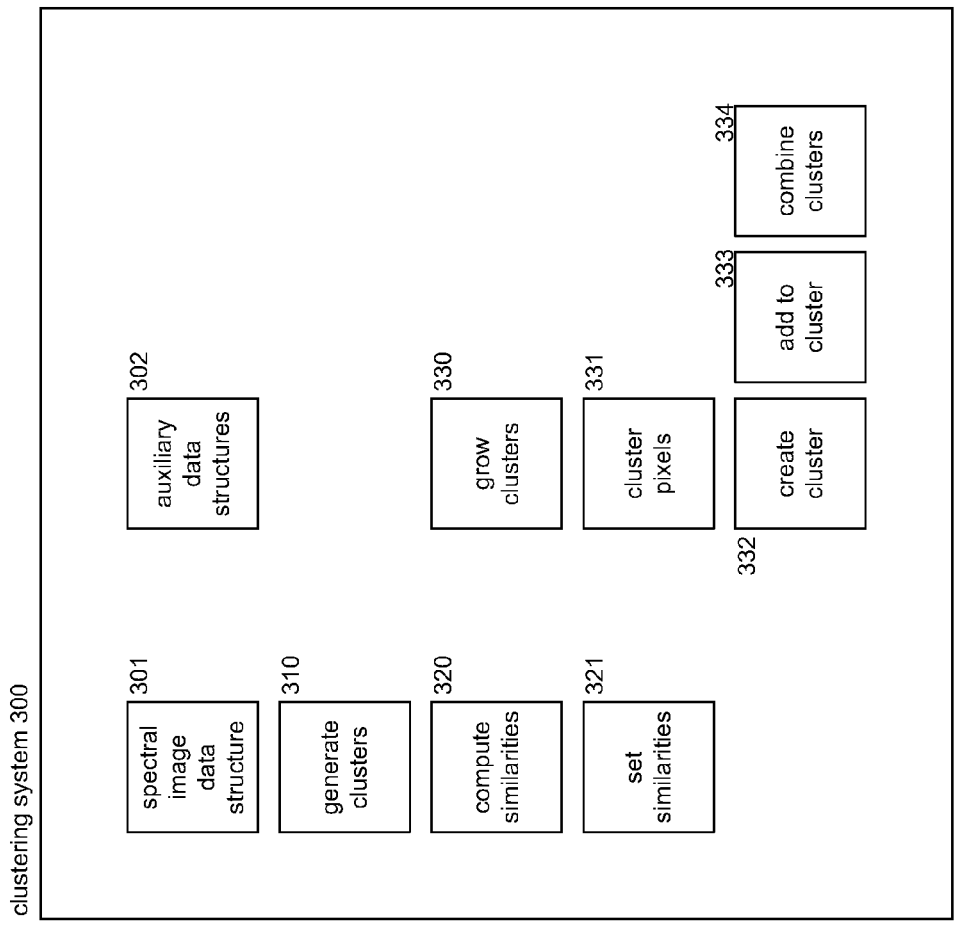
FIG. 3 is a block diagram that illustrates components of a clustering system 300 in some embodiments.

FIG. 3 is a block diagram that illustrates components of a clustering system 300 in some embodiments. The clustering system 300 includes a spectral image data structure 301 and auxiliary data structures 302. The spectral image data structure contains the intensity vectors for the pixels of a multispectral image. The auxiliary data structures contain data structures to support the clustering of the pixels. The clustering system also includes a generate dusters component 310 that, during each iteration, invokes a compute similarities component 320 and a grow dusters component 330. The compute similarities component computes the similarities by invoking the set similarities component 321 for each pixel. The grow dusters component grows the dusters by invoking the duster pixels component 331 for each pixel. The duster pixels component invokes the create duster component 332 to create a new duster of two pixels, an add to duster component 333 to add a pixel that is not currently in a duster to a duster, and a combine dusters component 334 to combine two dusters into one duster.

Figure 4:
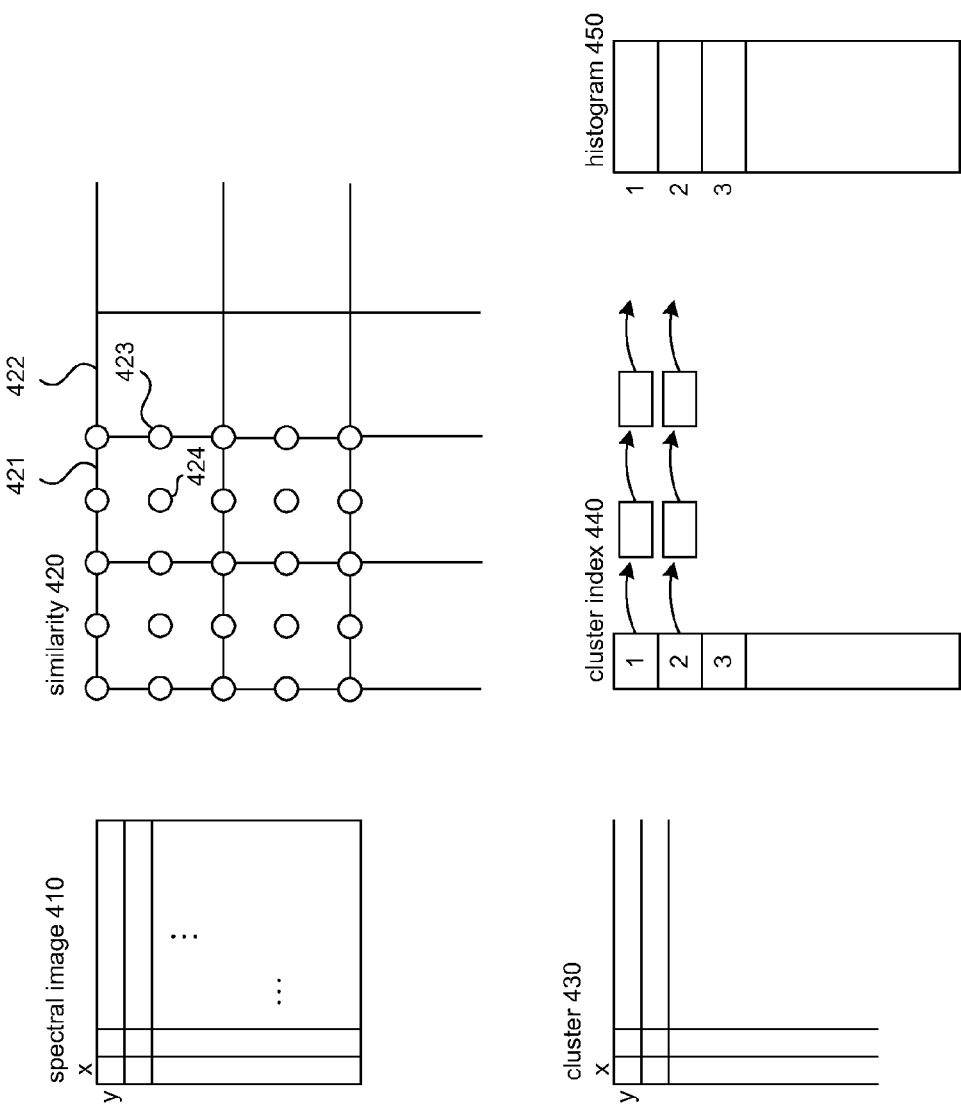
FIG. 4 illustrates the data structures of the clustering system in some embodiments.

FIG. 4 illustrates the data structures of the clustering system in some embodiments. A spectral image data structure 410 contains an entry for each pixel of a multispectral image where each entry contains the intensity vector for that pixel. A similarity data structure 420 contains an entry represented by a circle for the similarity scores between pixels and the maximum similarity score of each pixel. The similarity data structure may be considered to overlay the multispectral image. The squares represent the pixels. Pixels 421 and 422 are neighboring pixels. Circle 423 represents an entry that stores the similarity score between pixels 421 and 422. Circle 424 represents the entry that stores the maximum similarity score for pixel 421. Because the clustering system processes the spectral image a row at a time (or alternatively a column at a time), the clustering system may not need to store the similarity scores for a row after the similarity scores for the next row have been processed. As such, the clustering system does not actually need to store the similarity values for the entire multispectral image at the same time. Moreover, the clustering system may not need to store any of the similarity scores for previously processed pixels if it calculates all the similarity scores for each pixel as the pixel is being processed. A duster data structure 430 contains an entry for each pixel that indicates the duster to which each pixel currently belongs. A duster index data structure 440 provides a mapping of the pixels contained in each duster. Although the duster data structure and the duster index data structure contain redundant information; using these data structures can help speed up the processing time. A histogram data structure 450 contains an entry for each range of similarity scores, and each entry stores the count of pixels with maximum similarity scores within that range. One skilled in the art will appreciate that these data structures are merely example data structures that can be used by the clustering system. The clustering system may store the data using different types of data structures (e.g., link lists, arrays, hash tables, and trees).

The computing devices on which the clustering system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the clustering system. The data transmission media is media for transmitting data using signals or carrier waves (e.g., electromagnetism) via a wire or wireless connection. Various functions of the clustering system may also be implemented on devices using discrete logic or logic embedded as an application-specific integrated circuit. The clustering system may be implemented on a computing device that is local to a vehicle that collects multispectral images.

The clustering system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
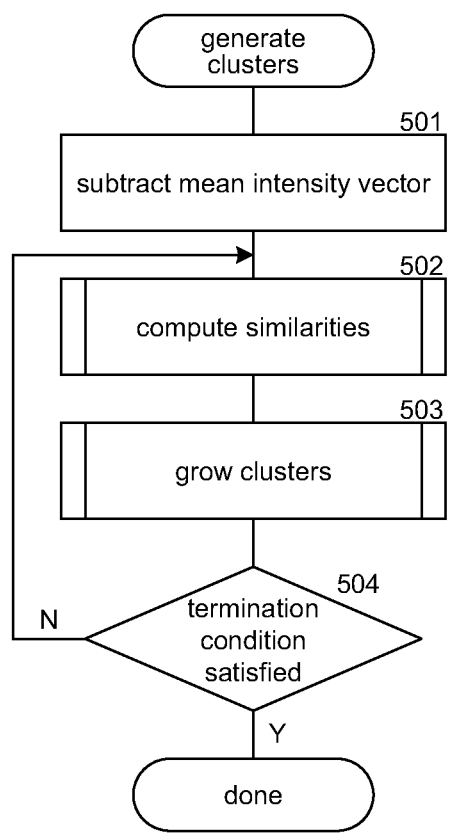
FIG. 5 is a flow diagram that illustrates the processing of a generate clusters component of the clustering system in some embodiments.

FIG. 5 is a flow diagram that illustrates the processing of a generate clusters component of the clustering system in some embodiments. The generate clusters component inputs a multispectral image and outputs an indication of the clusters. In block 501, the component subtracts the mean intensity vector of the multispectral image from the intensity vector of each pixel of the multispectral image. In blocks 502-504, the component loops performing the iterations of the clustering system. In block 502, the component invokes the compute similarities component to compute the similarity scores between each neighboring pixel of the multispectral image. Although not shown, after the compute similarities component returns, the component may set the clustering threshold based on the histogram populated by the compute similarities component. Also, after the first iteration, the component may identify the pixels that do not meet the minimum clustering criterion based on pixel similarity and may mark them as "do not cluster." In block 503, the component invokes the grow clusters component to grow the clusters based on the maximum similarity scores. In decision block 504, if a termination condition is satisfied, then the component completes, else the component loops to block 502 to perform the next iteration.

Figure 6:
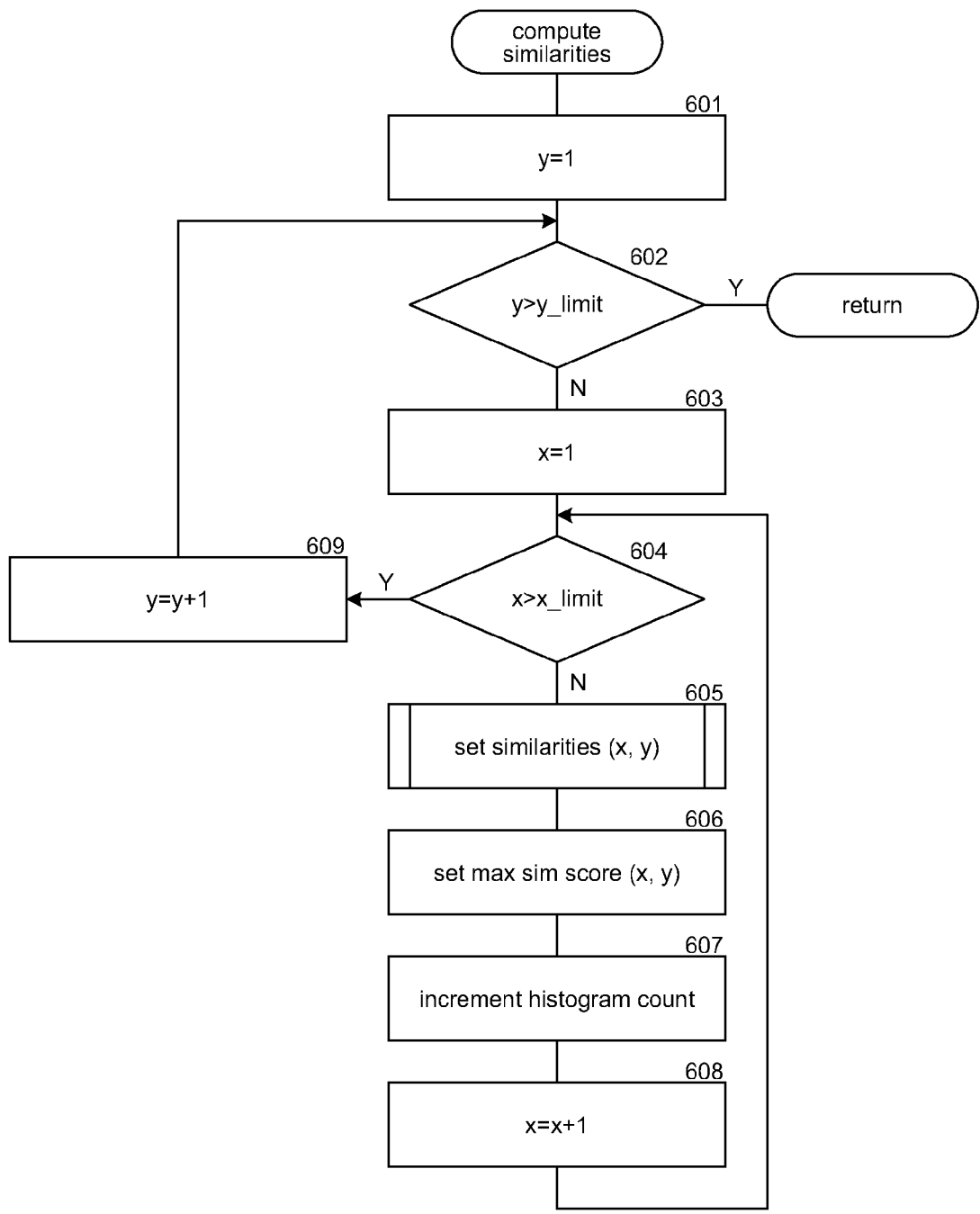
FIG. 6 is a flow diagram that illustrates the processing of a compute similarities component of the clustering system in some embodiments.

FIG. 6 is a flow diagram that illustrates the processing of a compute similarities component of the clustering system in some embodiments. The component calculates the similarity scores between neighboring pixels, sets the maximum similarity score for each pixel, and populates the histogram data structure. In block 601, the component initializes a row index of the multispectral image. In decision block 602, if the row index is greater than the row index limit, then all the rows have already been processed and the component returns, else the component continues at block 603, in block 603, the component initializes a column index of the multispectral image. In decision block 604, if the column index is greater than the column index limit, then all the columns for the row index have already been processed and the component continues at block 609, else the component continues at block 605. In block 605, the component invokes the set similarities component to calculate the similarity scores between the pixel represented by the row index and the column index and its neighboring pixels. In block 606, the component sets the maximum similarity score for the pixel represented by the row index and the column index to the highest similarity score of its neighboring pixels, not including a neighboring pixel that is already in the same cluster. In block 607, the component increments the histogram count for the range of similarity scores that contains the maximum similarity score. In block 608, the component increments the column index (i.e., selects the next column) and then bops to block 604 to process the next column. In block 609, the component increments the row index (i.e., selects the next row) and then loops to block 602 to process the next row.

Figure 7:
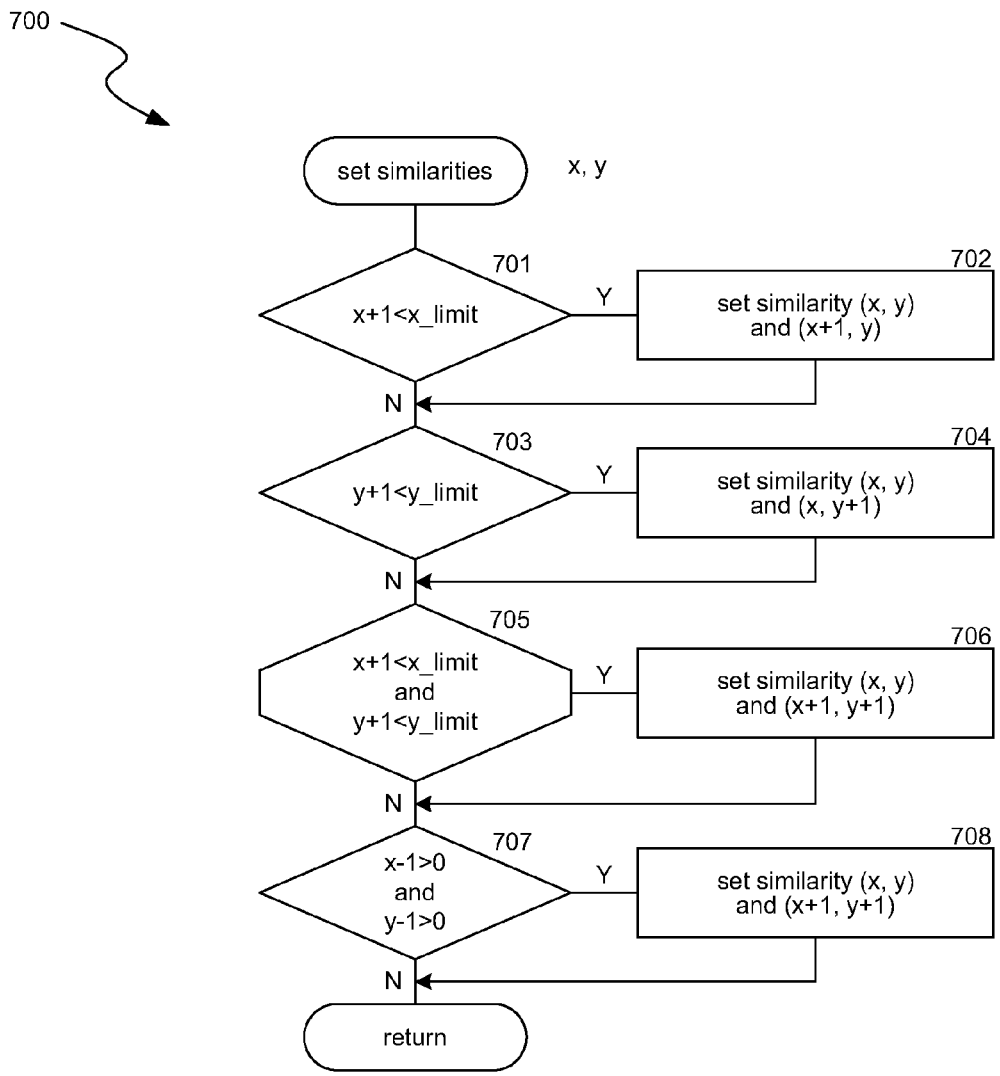
FIG. 7 is a flow diagram that illustrates the processing of a set similarities component of the clustering system in some embodiments.

FIG. 7 is a flow diagram that illustrates the processing of a set similarities component of the clustering system in some embodiments. The set similarities component 700 is passed a pixel (i.e., its row index and column index) and sets the similarity scores in the similarity data structure for the neighboring pixel that is located to the right (i.e., x direction) and the neighboring pixels located below (i.e., y direction). The clustering system may initialize the similarity scores at the boundaries of the similarity data structure to the similarity score indicating least similarity. In decision block 701, if the passed pixel has a pixel to the right, then the component calculates the similarity between those pixels in block 702, else the component continues at block 703. In decision block 703, if the passed pixel has a pixel below, then the component calculates the similarity between those pixels in block 704, else the component continues at block 705. In decision block 705, if the pixel has a pixel to the right and below, then the component calculates the similarity between those pixels in block 706, else the component continues at block 707. In decision block 707, if the passed pixel has a pixel to the left and below, the component calculates the similarity between those pixels in block 708, else the component returns.

Figure 8:
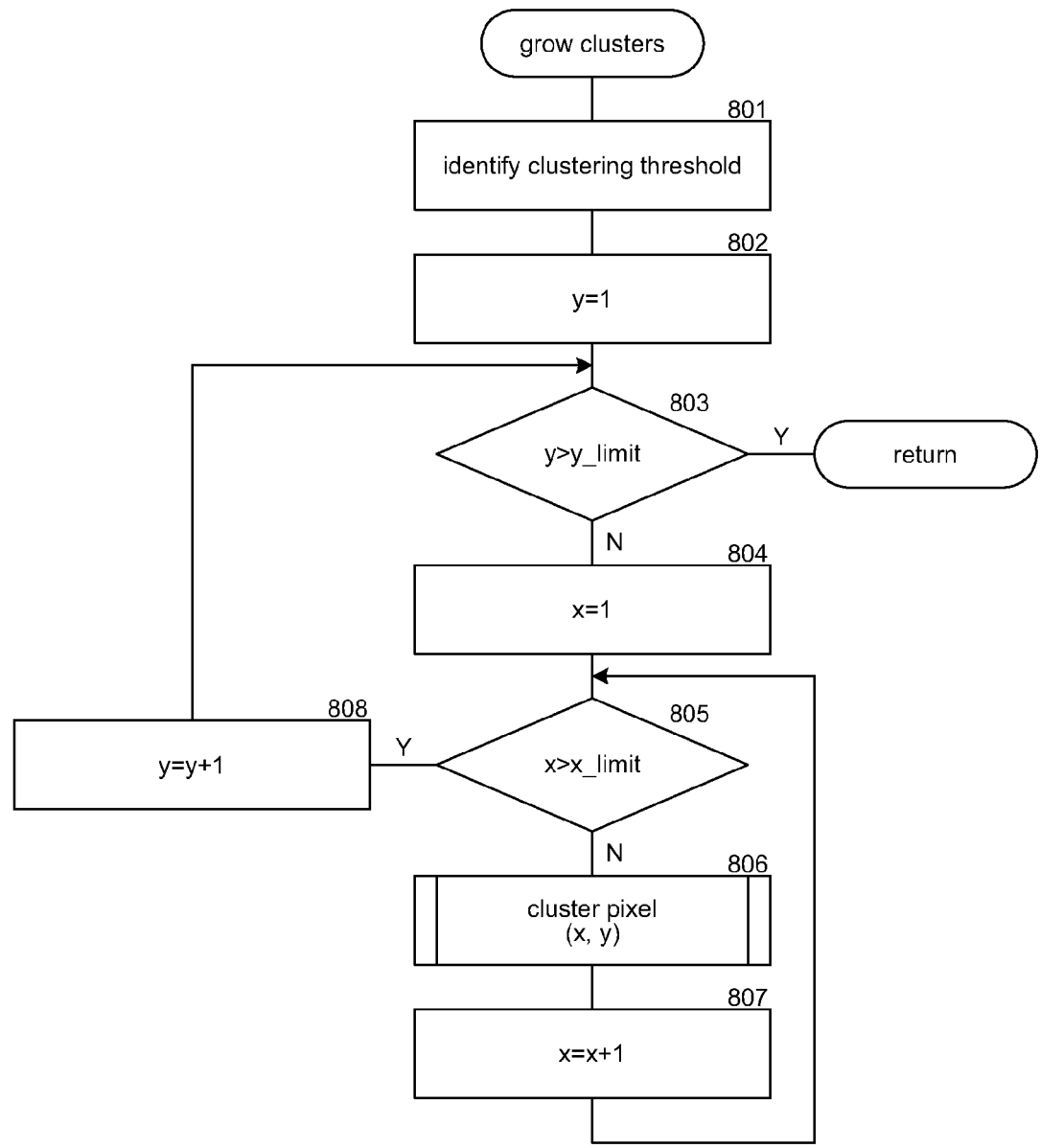
FIG. 8 is a flow diagram that illustrates the processing of the grow clusters component of the clustering system in some embodiments.

FIG. 8 is a flow diagram that illustrates the processing of the grow clusters component of the clustering system in some embodiments. The grow clusters component is invoked during each iteration after the similarity scores have been calculated. In block 801, the component identifies the clustering threshold for this iteration, which may be based on a clustering percentile of the maximum similarity scores. In blocks 802-808, the component loops selecting each row and then each column in the row to perform the clustering on each pixel. In block 802, the component selects the first row. In decision block 803, if all rows have already been selected, then the component returns, else component continues at block 804. In block 804, the component selects the first column of the selected row. In decision block 805 if all the columns for the selected row have already been selected, then the component continues at block 808, else the component continues at block 806. In block 806, the component invokes a cluster pixels component to perform the clustering on the selected pixel. In block 807, the component selects the next column of the selected row and then loops to block 805. In block 808, the component selects the next row and then bops to block 803 deceitful rows have already been selected.

Figure 9:
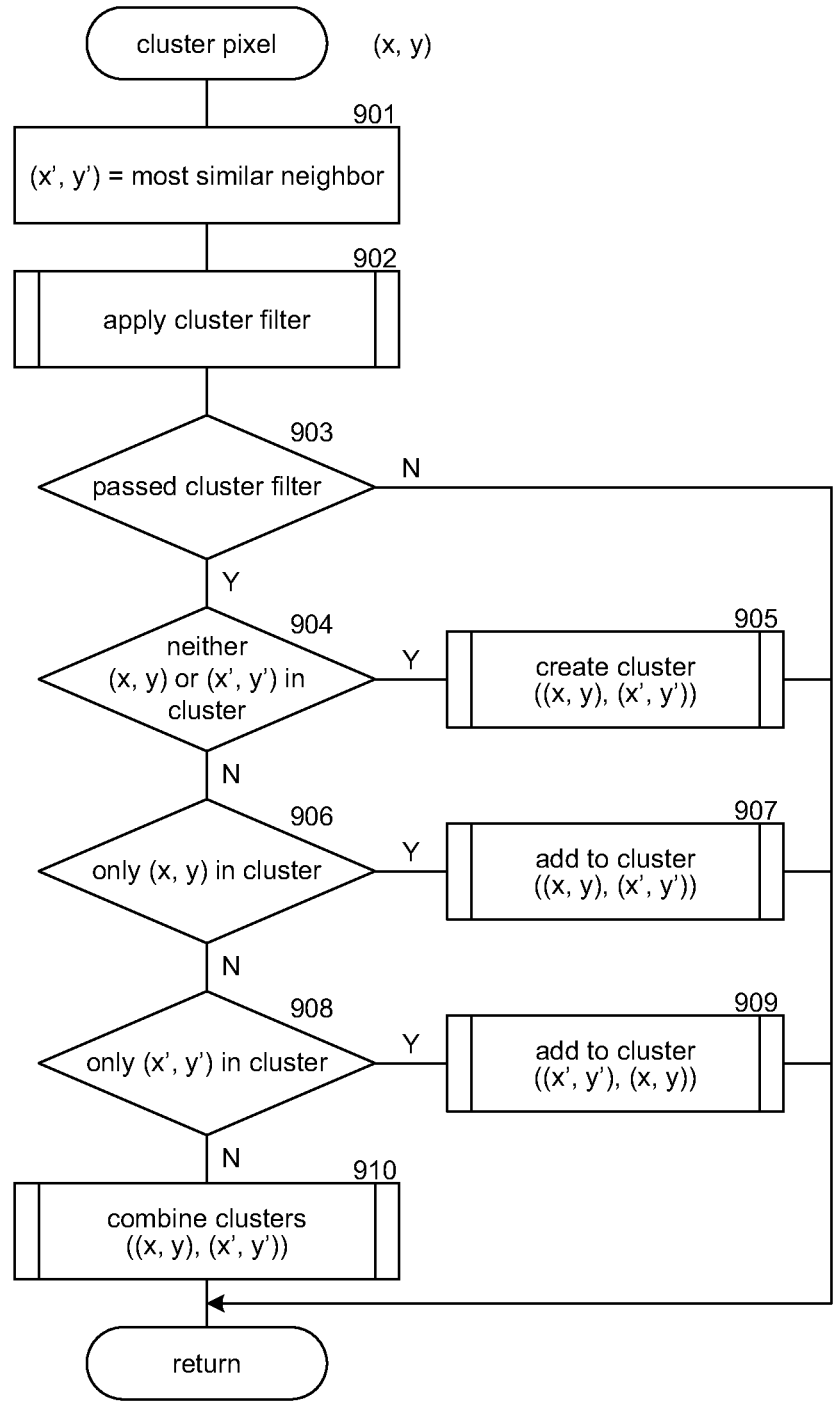
FIG. 9 is a flow diagram that illustrates the processing of the cluster pixels component of the clustering system in some embodiments.

FIG. 9 is a flow diagram that illustrates the processing of the cluster pixels component of the clustering system in some embodiments. The component is passed a pixel that is a center pixel to be clustered with one of its neighbors. In block 901, the component selects the most similar neighboring pixel. In block 902, the component invokes the apply filter component to determine whether the center pixel and its most similar neighboring pixel should be in the same cluster. In decision block 903, if the pixels passed the cluster filter, then the component continues at block 904, else the component returns. In decision block 904, if neither of the pixels is in a cluster, then the component continues at block 905, else the component continues at block 906. In block 905, the component invokes the create cluster component to create a new cluster with the two pixels and then returns. In decision block 906, if only the center pixel is in a cluster, then the component continues at block 907, else component continues at block 908. In block 907, the component invokes the add to cluster component to add the most similar neighboring pixel to the cluster that contains the center pixel and returns. In decision block 908, if only the most similar neighboring pixel is a cluster, then the component continues at block 909, else the component continues at block 910. In block 909, the component invokes the add to cluster component to add the center pixel to the cluster that contains the most similar neighboring pixel and then returns. In block 910, the component invokes the combine dusters component to combine the duster that contains the center pixel and the duster that contains the most similar neighboring pixel and then returns.

Figure 10:
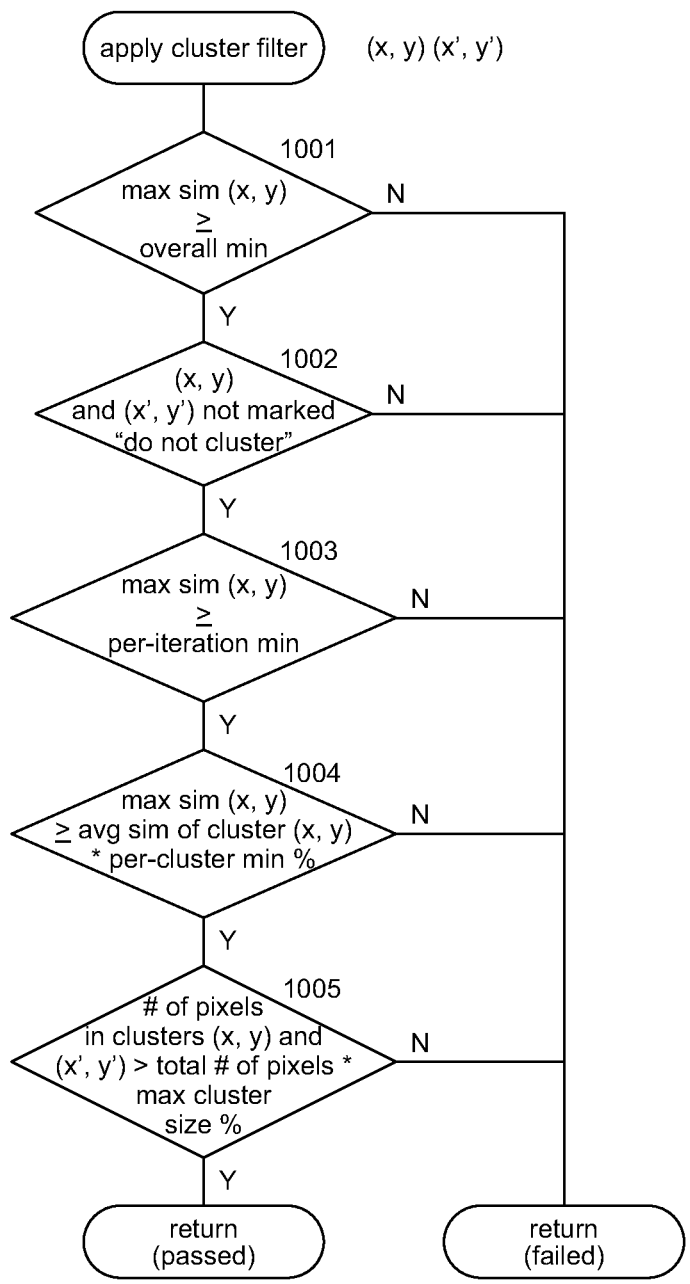
FIG. 10 is a flow diagram that illustrates the processing of the apply cluster filter component of the clustering system in some embodiments.

FIG. 10 is a flow diagram that illustrates the processing of the apply duster filter component of the clustering system in some embodiments. The component is passed a center pixel and its most similar neighboring pixel and determines whether those pixels should be in the same duster. In decision block 1001, if the maximum similarity score of the center pixel is greater than or equal to the overall minimum similarity threshold, then the component continues at block 1001, else the component returns an indication that the pixels did not pass the filtering criteria for clustering. In decision block 1002, if neither pixel is marked "do not duster," then the component continues at block 1003, else the component returns an indication that the pixels did not pass the filtering criteria for clustering. In decision block 1003, if the maximum similarity score of the center pixel is greater than or equal to the per-iteration minimum similarity threshold, then the component continues at block 1004, else the component returns an indication that the pixels did not pass the filtering criteria for clustering. In decision block 1004, if the maximum similarity score of the center pixel is greater than or equal to the product of the average maximum similarity score of the pixels in the duster with the center pixel and the per-cluster minimum percentage, then the component continues at block 1004, else the component returns an indication that the pixels did not pass the filtering criteria for clustering. The component may also ensure that the maximum similarity score of the center pixel passes the per-cluster minimum similarity for the duster that contains the most similar neighboring pixel. In decision block 1005, if the total number of pixels in the dusters that contain the center pixel and its most similar neighboring pixel is greater than the product of the total number of pixels in the multispectral image and the maximum duster size percentage, then the pixels pass the filtering criteria and the component returns an indication that the pixels passed the filtering criteria for clustering, else the component returns an indication that the pixels did not pass the filtering criteria for clustering.

Figure 11:
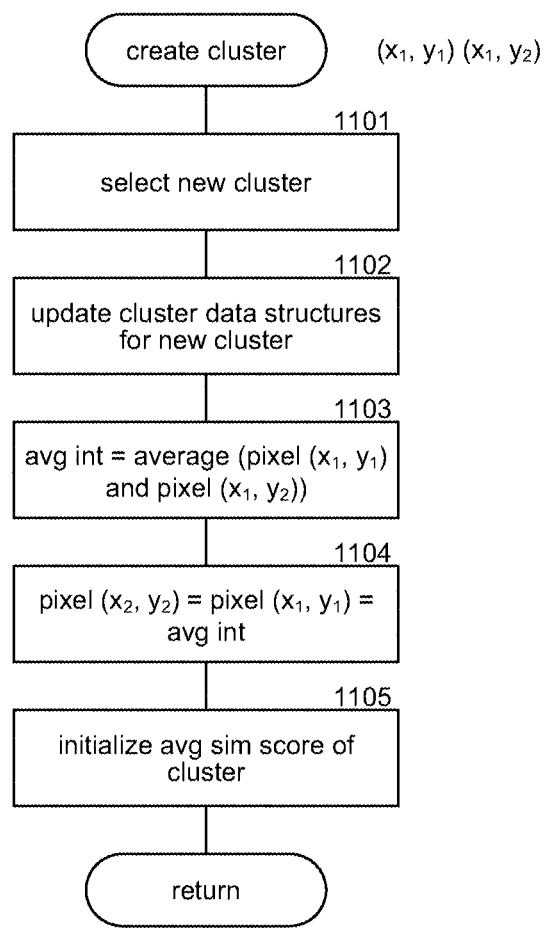
FIG. 11 is a flow diagram that illustrates the processing of the create clusters component of the clustering system in some embodiments.

FIG. 11 is a flow diagram that illustrates the processing of the create dusters component of the clustering system in some embodiments. The component is passed a center pixel and its most similar neighboring pixel and creates a new duster that contains both pixels. In block 1101, the component selects a new duster (e.g., selecting an unused entry in the duster index data structure). In block 1102, the component updates the duster data structures to reflect the new duster (e.g., setting the entries in the duster data structure for the pixels and updating the entry for the duster in the duster index data structure). In block 1103, the component sets the average intensity vector for the duster (e.g., the sum of the intensity vectors of the pixels divided by two). In block 1104, the component sets the intensity vector for both pixels to the average intensity vector. In block 1105, the component initializes the average similarity score for the duster (e.g., to the maximum similarity score of the center pixel) and then returns.

Figure 12:
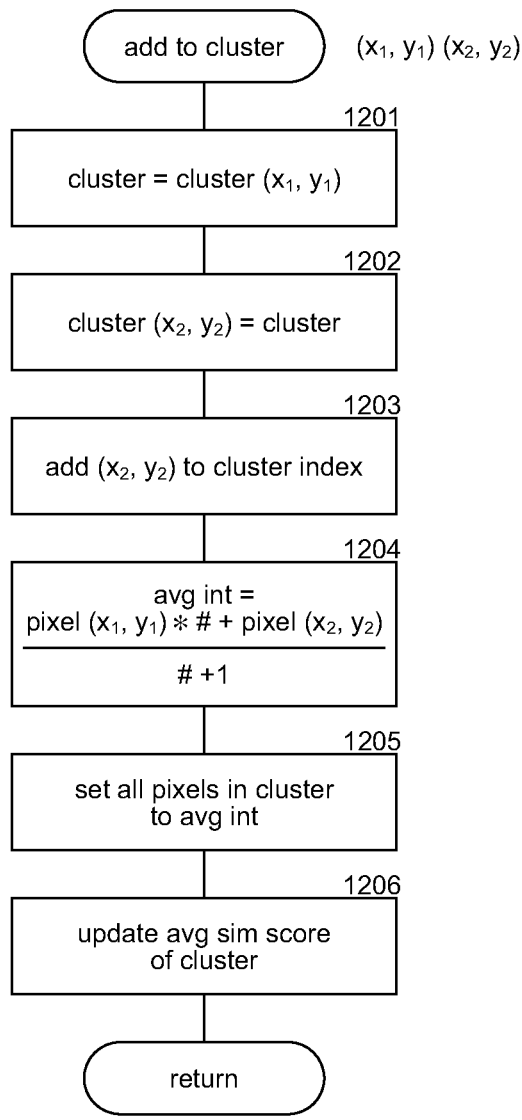
FIG. 12 is a flow diagram that illustrates the processing of the add to cluster component of the clustering system in some embodiments.

FIG. 12 is a flow diagram that illustrates the processing of the add to duster component of the clustering system in some embodiments. The component is passed a first pixel and a second pixel and adds the second pixel to the duster that contains the first pixel. In block 1201, the component identifies the duster of the first pixel from the duster data structure. In block 1202, the component sets the duster of the second pixel to the duster of the first pixel. In block 1203, the component adds the second pixel to the duster of the first pixel in the duster index. In block 1204, the component calculates the average intensity vector for the duster with the second pixel added where # represents number of pixels in the duster before adding the second pixel. In block 1205, the component sets the intensity vector for all pixels of the duster to the average intensity vector. In block 1206, the component updates the average similarity score for the duster and then returns.

Figure 13:
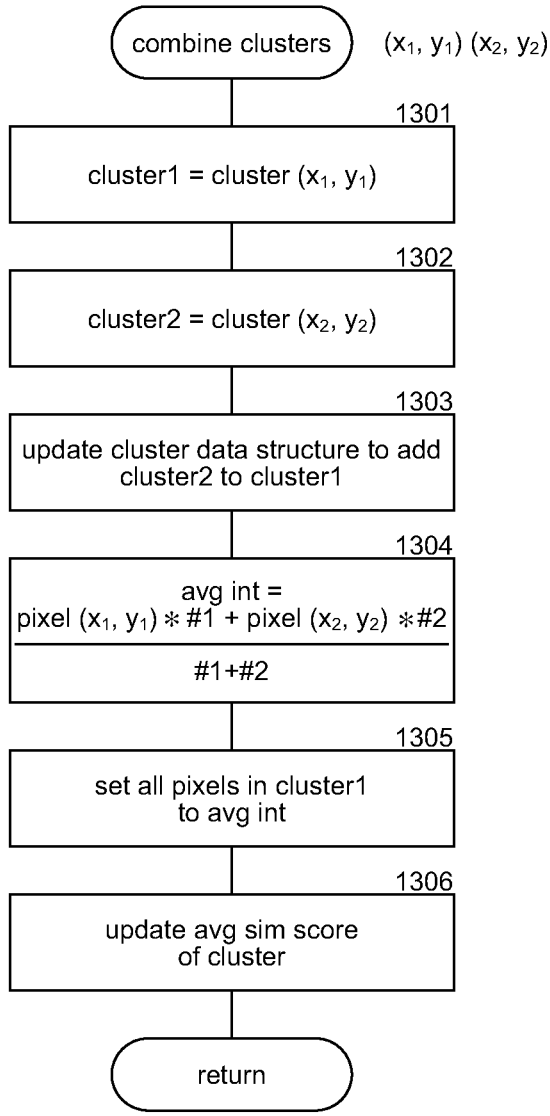
FIG. 13 is a flow diagram that illustrates the processing of the combine clusters component of the clustering system in some embodiments.

FIG. 13 is a flow diagram that illustrates the processing of the combine dusters component of the clustering system in some embodiments. The component is passed two pixels that are in separate dusters and combines the dusters into a single duster. In block 1301, the component identifies the duster of the first pixel from the duster data structure. In block 1302, the component identifies the duster of the second pixel from the duster data structure. In block 1303, the component updates the data structures (e.g., duster and duster index data structure) so that all of the pixels of the second duster are added to the first duster. In block 1304, the component calculates the average intensity vector for the combined duster where #1 is number of pixel in the duster of the first pixel. In block 1305, the component sets all the pixels in the combined duster to the average intensity vector. In block 1306, the component updates the average similarity score for the pixels in the combined duster and then returns.

From the foregoing, it will be appreciated that specific embodiments of the invention have been described herein for purposes of illustration but that various modifications may be made without deviating from the scope of the invention. Accordingly, the invention is not limited except as by the appended claims.

I claim:

1. A method in a computing device for spatial clustering of pixels of a multispectral image, the method comprising:
   determining a maximum similarity score for each pixel by computing a similarity score between that pixel and each of its neighboring pixels, the similarity score based on pixel values; and
   setting the maximum similarity score for that pixel to the maximum of the computed similarity scores for that pixel; and
   clustering the pixels into clusters by, when a filtering criterion is passed for a pixel,
      combining into the same cluster that pixel and the neighboring pixel with the maximum similarity score; and
      setting the pixel values of the pixels in the cluster to an average of the original pixel values of the pixels that are in the cluster; and
   repeating iterations of the determining and the clustering until a termination criterion is satisfied.

2. The method of claim 1 wherein the similarity scores are a cosine similarity.

3. The method of claim 1 wherein the similarity scores are based on an arccosine of a normalized dot product of intensity vectors of the pixels.

4. The method of claim 1 wherein the similarity scores are based on an inverse of an arccosine of a normalized dot product of intensity vectors of the pixels.

5. The method of claim 1 wherein the filtering criterion is a per-iteration minimum threshold for the maximum similarity score.

6. The method of claim 1 wherein the filtering criterion is an overall minimum threshold for the maximum similarity score.

7. The method of claim 1 wherein when a pixel is already in a cluster of pixels, all pixels of the cluster are included in the combining.

8. The method of claim 1 wherein the filtering criterion is a first-iteration minimum threshold.

9. The method of claim 1 wherein the filtering criterion is a maximum cluster size.

10. A computer-readable memory device containing computer-executable instructions for controlling a computing device to cluster contiguous pixels of a multispectral image, by a method comprising:
   computing a maximum similarity score for each pixel that indicates the similarity of the most similar neighboring pixel based on a comparison of pixel values of the pixels;
   clustering neighboring pixels when a pixel has a maximum similarity score that passes a filtering criterion wherein the pixel values of the pixels in the cluster are set based on an averaging of the pixel values of the pixels in the cluster; and
   repeating iterations of the computing and clustering until a termination criterion is satisfied.

11. The computer-readable memory device of claim 10 wherein the termination criterion is based on a number of iterations.

12. The computer-readable memory device of claim 10 wherein the termination criterion is based on changes to the clusters during the current iteration.

13. The computer-readable memory device of claim 10 wherein the similarity is based on a cosine-based similarity.

14. The computer-readable memory device of claim 10 wherein the filtering criterion is per-iteration minimum threshold.

15. The computer-readable memory device of claim 10 wherein when a pixel is already in a cluster of pixels, all pixels of the cluster are included in any clustering of that pixel.

16. The computer-readable memory device of claim 10 wherein the filtering criterion is first-iteration minimum threshold.

17. The computer-readable memory device of claim 10 wherein the filtering criterion is per-cluster similarity threshold.

18. A computing device for clustering pixels of a multispectral image, comprising:
   a memory storing computer-executable instructions of:
      a compute similarities component that computes a maximum similarity score for each pixel indicating its similarity to the most similar neighboring pixel based on a comparison of pixel values of the pixels;
      a grow clusters component that clusters neighboring pixels when a pixel has a maximum similarity score that passes a filtering criterion wherein the pixel values of pixels in the cluster are set based on an averaging of the pixel values of the pixels in the cluster; and
      a component that repeatedly invokes the compute similarities component and the grow clusters component until a termination criterion is satisfied; and
   a processor that executes the computer-executable instructions stored in the memory.

19. The computing device of claim 18 wherein the filtering criterion is a per-iteration minimum threshold.

20. The computing device of claim 18 wherein the filtering criterion is a first-iteration minimum threshold.

21. The method of claim 1 wherein the computing of the similarity score weights frequencies of interest in the multispectral image more heavily than other frequencies.

22. The method of claim 1 wherein pixels are processed in a row-major ordering.

* * * * *